(12) United States Patent
Tamilarasan et al.

(10) Patent No.: US 11,695,852 B1
(45) Date of Patent: Jul. 4, 2023

(54) MANAGING OVERLAPPING COMMUNICATIONS BETWEEN DOWNTIERING AND INVALIDATING CACHED DATA AMONG NODES IN A STORAGE SYSTEM

(71) Applicant: Dell Products L.P., Round Rock, TX (US)

(72) Inventors: Ashok Tamilarasan, Shrewsbury, MA (US); Philippe Armangau, Acton, MA (US); Vamsi K. Vankamamidi, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/584,963

(22) Filed: Jan. 26, 2022

(51) Int. Cl.
*G06F 13/00* (2006.01)
*H04L 67/568* (2022.01)

(52) U.S. Cl.
CPC .................. *H04L 67/568* (2022.05)

(58) Field of Classification Search
CPC .................................................... H04L 67/568

USPC ................................. 709/201, 203, 213–216
See application file for complete search history.

(56) References Cited

U.S. PATENT DOCUMENTS

| | | | |
|---|---|---|---|
| 10,049,228 B2* | 8/2018 | Ou-Yang | G06F 16/00 |
| 10,691,693 B2* | 6/2020 | Fanghaenel | G06F 16/24552 |
| 10,726,147 B2* | 7/2020 | Ou-Yang | G06F 21/6218 |
| 11,269,885 B2* | 3/2022 | Fanghaenel | G06F 16/2246 |
| 2016/0210469 A1* | 7/2016 | Ou-Yang | G06F 16/00 |
| 2019/0065768 A1* | 2/2019 | Ou-Yang | G06F 21/6218 |
| 2019/0236156 A1* | 8/2019 | Fanghaenel | G06F 16/172 |
| 2020/0320081 A1* | 10/2020 | Fanghaenel | G06F 12/0891 |
| 2022/0188317 A1* | 6/2022 | Fanghaenel | G06F 16/86 |

* cited by examiner

*Primary Examiner* — Kenneth R Coulter
(74) *Attorney, Agent, or Firm* — Krishnendu Gupta; Deepika Bhayana; Derek Lam

(57) ABSTRACT

A method is used for managing overlapping communications regarding downtiering and invalidating cached data among nodes in a storage system. The method includes identifying, by a node, data to downtier. The node adds the data to an in progress table, and sends a request for permission to downtier the data to a peer node. The node receives permission from the peer node to downtier the data. In response to the permission to downtier the data, the node checks the in progress table for the data and takes an action based on a result of checking the in progress table.

20 Claims, 11 Drawing Sheets

MANAGING OVERLAPPING COMMUNICATIONS BETWEEN DOWNTIERING AND INVALIDATING CACHED DATA AMONG NODES IN A STORAGE SYSTEM

BACKGROUND

Technical Field

This application relates to managing overlapping communications between downtiering and invalidating cached data stored on nodes in a storage system.

Description of Related Art

A distributed storage system may include a plurality of storage devices to provide data storage to a plurality of hosts. The plurality of storage devices and the plurality of hosts may be situated in the same physical location, or in one or more physically remote locations. The storage devices and the hosts may be connected to one another over one or more computer networks. The storage system may be organized into multiple nodes.

Each node in the storage system may include a cache and storage devices of varied performance characteristics. The storage devices may be grouped into tiers, and data can be migrated between the cache and tiers of storage devices based on the temperature and write activity of the data. In general, hot data is migrated to faster (and typically more expensive) storage (e.g., cache), and cold data is migrated to slower (and typically less expensive) storage (e.g., hard disk drives, or HDDs). In some examples, hot data may be migrated from cache to an intermediate storage, such as a solid-state drive (SSD), and this intermediate storage may be treated as a secondary layer of cache. As the temperature of the data cools, the data may be further migrated from intermediate storage to slower storage, and vice versa. When data is migrated from faster storage to comparatively slower storage, the data is said to be "downtiered". When data is stored on multiple nodes for redundancy, nodes may inform one another of the downtiering of data, and may ask permission from another node to downtier data before migrating the data.

Furthermore, a storage system may have a log-structured file system, such that data and/or metadata are written sequentially to a circular buffer. Data may be referenced according to a key corresponding to the data's location in the buffer. Over time, as the storage system processes more data, the storage system overwrites data in the buffer, thereby associating the keys with new data. As a result, associations between keys and previous data can no longer be relied upon, and the data must be marked as invalid or otherwise processed to prevent the storage system from returning erroneous data. When one node invalidates data, the node notifies other nodes of the action.

SUMMARY OF THE INVENTION

One aspect of the current technique is a method for managing overlapping communications regarding downtiering and invalidating cached data among nodes in a storage system. The method includes identifying, by a node, data to downtier. The node adds the data to an in progress table, and sends a request for permission to downtier the data to a peer node. The node receives permission from the peer node to downtier the data. In response to the permission to downtier the data, the node checks the in progress table for the data and takes an action based on a result of checking the in progress table.

The node may receive an instruction from the peer node to invalidate the data and check the in progress table for the data. In response to finding the data in the in progress table, the node may remove the data from the in progress table. The node may invalidate the data in the cache. In response to finding the data in the in progress table, the node may send to the peer node confirmation that the data has been invalidated and a message to expect a request for permission to downtier the data.

If the data has been found in the in progress table, the node may downtier the data from cache to secondary storage. If the data has not been found in the in progress table, the node may infer the data has been invalidated so as to leave the invalidated data in the cache.

The peer node may receive the confirmation that the data has been invalidated and the message to expect a request for permission to downtier the data, and store the data in an expected downtiering requests table. The peer node may invalidate the data in the cache. The peer node may receive the request for permission to downtier the data from the node and check the expected downtiering table for the data. The peer node may take an action based on a result of checking the expected downtiering table. If the data has been found in the expected downtiering table, the peer node may infer the data has been invalidated so as to leave the invalidated data in the cache. If the data has not been found in the expected downtiering table, the peer node may downtier the data from the cache to secondary storage.

Another aspect of the current technique is a system, with a processor, for managing overlapping communications regarding downtiering and invalidating cached data among nodes. The processor may be configured to perform any process in conformance with the aspect of the current techniques described above.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Described below are techniques for managing races between downtiering and invalidating cached data stored on nodes in a storage system. The techniques includes identifying, by a node, data to downtier. The node adds the data to an in progress table, and sends a request for permission to downtier the data to a peer node. The node receives permission from the peer node to downtier the data. In response to the permission to downtier the data, the node checks the in progress table for the data and takes an action based on a result of checking the in progress table.

In a distributed storage system, a node that has selected data to downtier from cache to a solid state drive (SSD) contacts other nodes to request permission to do so. The node does not migrate the data until permission has been received. Separately and contemporaneously, a peer node can overwrite data in its circular buffer so as to invalidate certain data. Because that data can no longer be relied upon, the node contacts other nodes in the cluster to ensure that the data is invalidated in their caches. When a node invalidates cached data based on instructions from a peer node, the node confirms to the peer node that the invalidation has been completed.

Due to network latencies, communications between nodes regarding downtiering and invalidation can overlap and cause undesirable outcomes. For example, while waiting for permission from a peer node to downtier data, a node may receive an instruction from the peer to invalidate the same data. The node may invalidate the data, only to downtier the invalid data once permission to do so has been received. As a result, data in intermediate/slower storage becomes corrupted.

Locks offer one possible solution to the race between downtiering and invalidation communications. A node may identify data to downtier, acquire a lock on the data, and request permission from a peer node to perform the downtiering. Since the data cannot be altered until permission to downtier is received, the node can assess intervening messages (e.g., instructions to invalidate the data) before determining the correct course of action for the data. However, the lock incurs a bottleneck on data and thus detracts from the performance of the storage system.

The techniques described herein use tables to track communications sent to and/or received from peer nodes. As a result, the nodes coordinate downtiering and invalidation of data in a manner that avoids retrieval of invalid data and reduces consumption of computing resources. In at least some implementations in accordance with the techniques as described herein, one or more of the following advantages can be provided: reduction in erroneous data retrieved and prevention of computing resources expended to migrate data that will be invalidated.

Figure 1:
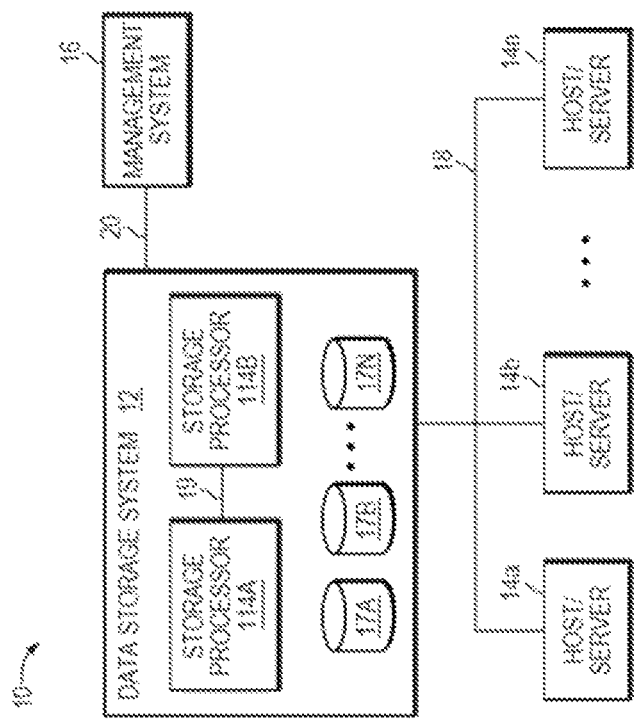
FIG. 1 depicts an example embodiment of a computer system that may be used in connection with performing the techniques described herein.

FIG. 1 depicts an example embodiment of a computer system 10 that may be used in connection with performing the techniques described herein. The system 10 includes one or more data storage systems 12 connected to server or hosts 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the hosts 14a-14n may access and communicate with the data storage systems 12, and may also communicate with other components (not shown) that may be included in the system 10. In one embodiment, the communication medium 20 may be a LAN connection and the communication medium 18 may be an iSCSI, Fibre Channel, Serial Attached SCSI, or Fibre Channel over Ethernet connection.

Each of the hosts 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the hosts 14a-14n and management system 16 may be any one of a variety of proprietary or commercially available single or multi-processor system, or other type of commercially available processor able to support traffic in accordance with any embodiments described herein.

It should be noted that the particular examples of the hardware and software that may be included in the data storage systems 12 are described herein in more detail, and may vary with each particular embodiment. Each of the hosts 14a-14n, the management system 16 and data storage systems 12 may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts 14a-14n, management system 16, and data storage systems 12 may be connected to their respective communication medium 18, 20 may pass through other communication devices, such as switching equipment that may exist such as a phone line, a repeater, a multiplexer or even a satellite. In one embodiment, the hosts 14a-14n may communicate with the data storage systems 12 over an iSCSI or a Fibre Channel connection and the management system 16 may communicate with the data storage systems 12 over a separate network connection using TCP/IP. It should be noted that although FIG. 1 illustrates communications between the hosts 14a-14n and data storage systems 12 being over a first communication medium 18, and communications between the management system 16 and the data storage systems 12 being over a second different communication medium 20, other embodiments may use the same connection. The particular type and number of communication mediums and/or connections may vary in accordance with particulars of each embodiment.

Each of the hosts 14a-14n may perform different types of data operations in accordance with different types of tasks. In the embodiment of FIG. 1, any one of the hosts 14a-14n may issue a data request to the data storage systems 12 to perform a data operation. For example, an application executing on one of the hosts 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. The management system 16 may, for example, display information about a current storage volume configuration, provision resources for a data storage system 12, and the like.

Each of the data storage systems 12 may include one or more data storage devices 17a-17n. Unless noted otherwise, data storage devices 17a-17n may be used interchangeably herein to refer to hard disk drive, solid state drives, and/or other known storage devices. One or more data storage devices 17a-17n may be manufactured by one or more different vendors. Each of the data storage systems included in 12 may be inter-connected (not shown). Additionally, the data storage systems 12 may also be connected to the hosts 14a-14n through any one or more communication connections that may vary with each particular embodiment. The type of communication connection used may vary with certain system parameters and requirements, such as those related to bandwidth and throughput required in accordance with a rate of I/O requests as may be issued by the hosts 14a-14n, for example, to the data storage systems 12. It should be noted that each of the data storage systems 12 may operate stand-alone, or may also be included as part of a storage area network (SAN) that includes, for example, other components such as other data storage systems 12. The particular data storage systems 12 and examples as described herein for purposes of illustration should not be construed as a limitation. Other types of commercially available data storage systems 12, as well as processors and hardware controlling access to these particular devices, may also be included in an embodiment.

In such an embodiment in which element 12 of FIG. 1 is implemented using one or more data storage systems 12, each of the data storage systems 12 may include code thereon for performing the techniques as described herein.

Servers or hosts, such as 14a-14n, provide data and access control information through channels on the communication medium 18 to the data storage systems 12, and the data storage systems 12 may also provide data to the host systems 14a-14n also through the channels 18. The hosts 14a-14n may not address the disk drives of the data storage systems 12 directly, but rather access to data may be provided to one or more hosts 14a-14n from what the hosts 14a-14n view as a plurality of logical devices or logical volumes (LVs). The LVs may or may not correspond to the actual disk drives. For example, one or more LVs may reside on a single physical disk drive. Data in a single data storage system 12 may be accessed by multiple hosts 14a-14n allowing the hosts 14a-14n to share the data residing therein. An LV or LUN (logical unit number) may be used to refer to the foregoing logically defined devices or volumes.

The data storage system 12 may be a single unitary data storage system, such as single data storage array, including two storage processors 114A, 114B or computer processing units. Techniques herein may be more generally use in connection with any one or more data storage system 12 each including a different number of storage processors 114 than as illustrated herein. The data storage system 12 may include a data storage array 116, including a plurality of data storage devices 17a-17n and two storage processors 114A, 114B. The storage processors 114A, 114B may include a central processing unit (CPU) and memory and ports (not shown) for communicating with one or more hosts 14a-14n. The storage processors 114A, 114B may be communicatively coupled via a communication medium such as storage processor bus 19. The storage processors 114A, 114B may be included in the data storage system 12 for processing requests and commands. In connection with performing techniques herein, an embodiment of the data storage system 12 may include multiple storage processors 114 including more than two storage processors as described. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 20. In one embodiment, the management system 16 may be a laptop or desktop computer system.

The particular data storage system 12 as described in this embodiment, or a particular device thereof, such as a disk, should not be construed as a limitation. Other types of commercially available data storage systems 12, as well as processors and hardware controlling access to these particular devices, may also be included in an embodiment.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files of a file system and locating file data using inode structures. In yet other arrangements, the data storage system 12 stores LUNs and file systems, stores file systems within LUNs, and so on.

The two storage processors 114A, 114B (also referred to herein as "SP") may control the operation of the data storage system 12. The processors may be configured to process requests as may be received from the hosts 14a-14n, other data storage systems 12, management system 16, and other components connected thereto. Each of the storage processors 114A, 114B may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two storage processors 114A, 114B. Upon the occurrence of failure of one the storage processors 114A, 114B, the other remaining storage processors 114A, 114B may handle all processing typically performed by both storage processors 114A.

Figure 2:
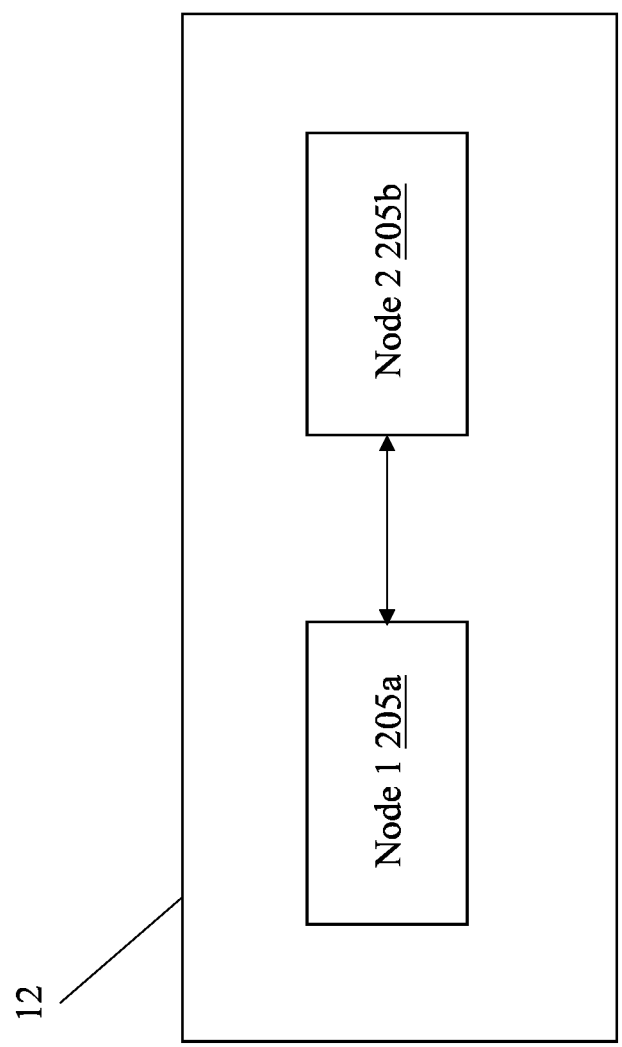
FIG. 2 is a block diagram depicting exemplary nodes among which the elements of the computer system of FIG. 1 may be distributed.

FIG. 2 is a block diagram depicting exemplary nodes 205a, 205b (individually and collectively, "205") among which the elements of the storage system 12 may be distributed. Although FIG. 2 depicts two nodes 205a, 205b, various embodiments of the invention may include any number of nodes. The nodes 205 may form a cluster. Each node 205 may receive I/O requests, and communicate with one another to ensure that the data on the nodes 205 are consistent with one another.

Figure 3:
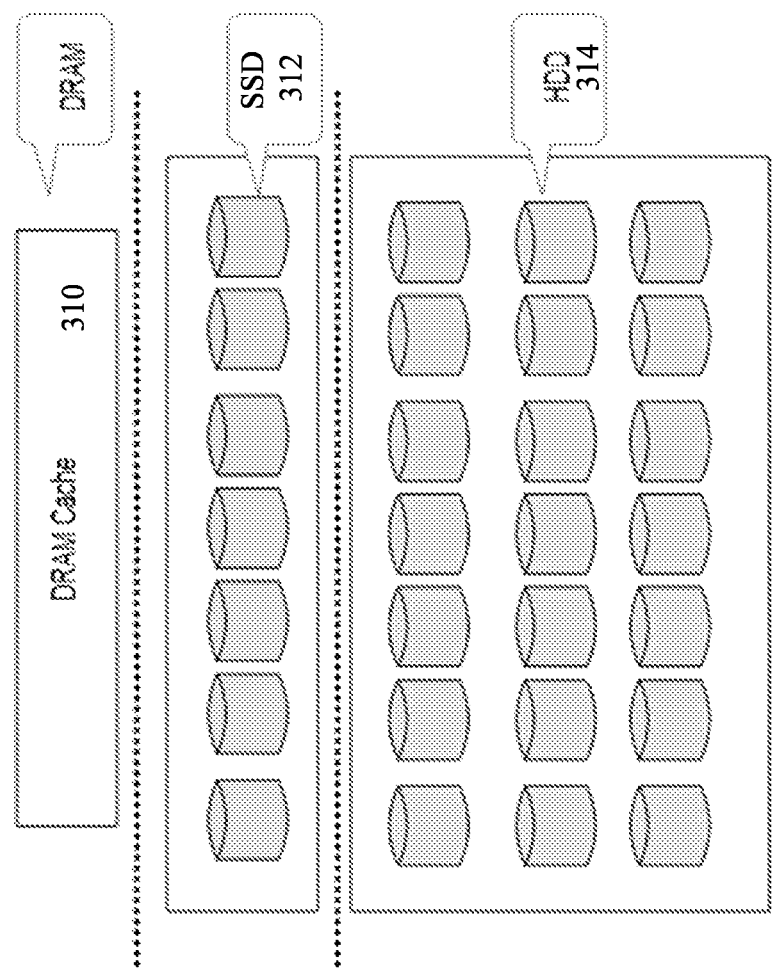
FIG. 3 is a schematic diagram depicting exemplary layers of memory and storage that may be used on a node in the computer systems of FIGS. 1 and 2.

FIG. 3 is a schematic diagram depicting exemplary layers of memory and storage that may be used on a node 205 in the computer systems 12 of FIGS. 1 and 2. The layers include DRAM cache 310, SSD cache 312, and a backend physical storage device (PD) layer 314. The SSD cache 312 may include any type of solid state storage devices 17, such as flash-based storage devices 17. The PD layer 314 may include, for example, hard disk drives 17 that provide non-volatile storage for data and may be organized into groups such as RAID groups providing the backend PDs.

In at least one embodiment of the illustrated hierarchy of FIG. 3, the SSD cache 312 is under the DRAM or general data cache 310, and below the SSD cache 312 are backend PDs 314. Generally, the DRAM cache 310, also referred to herein as the cache or data cache, may be the primary or highest caching layer such as mentioned above where read and write data are placed on first instance in connection with an I/O operation. Thus, in one aspect, the DRAM cache 310 may denote a level 1 (L1) primary cache and the SSD cache 312 may denote a level 2 (L2) secondary cache. Element 310 may denote, for example, the cache to which data is first written when write operations are received by the host 14 such as described above. Generally, the layers of FIG. 3 may be ranked, in terms of relative performance, from highest to lowest, as follows: DRAM cache 310, the SSD cache 312, and PDs 314. The SSD cache 312 may include flash-based storage devices. More generally, the SSD cache 312 may include a form of solid state or other storage that may be non-volatile or volatile which fits in with the above-mentioned relative performance ranking.

Figure 4:
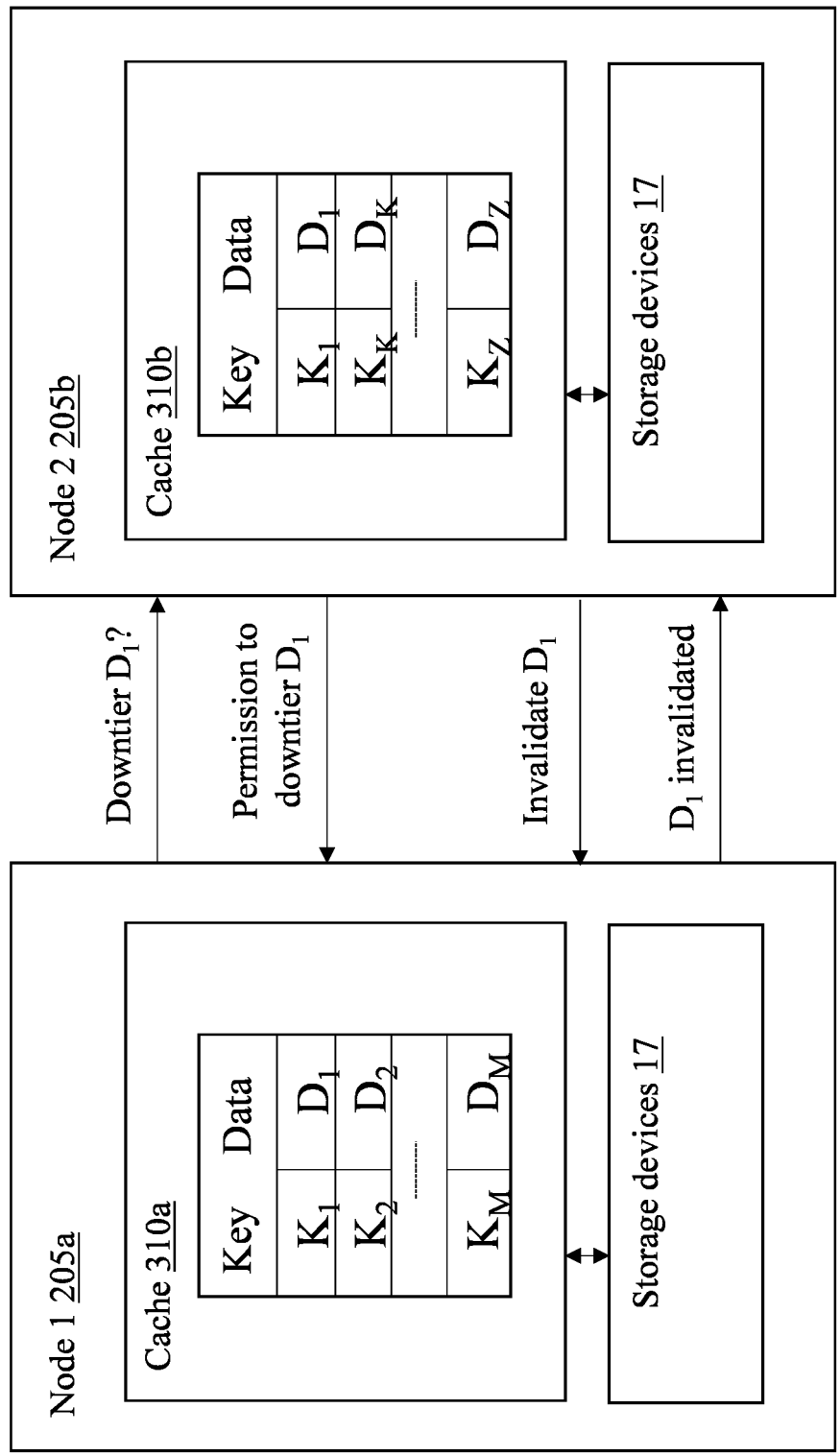
FIG. 4 is a schematic diagram depicting cached contents of nodes and communications between the nodes regarding downtiering and invalidation of data.

FIG. 4 is a schematic diagram depicting cached contents of nodes 205a, 205b and communications between the nodes 205a, 205b regarding downtiering and invalidation of data. The nodes 205a, 205b store recently accessed data and associated keys in their caches 310a, 310b; some of the keys and data between the caches 310 overlap, whereas other keys and data are stored exclusively in one node 205a or the other node 205b. When one node 205a identifies data, such as Di, to downtier, the node 205a requests permission from the peer node 205b. The peer node 205b grants permission, after which the node 205a migrates the data to a storage device 17 in the SSD cache 312.

As the peer node 205b writes to its circular buffer, the peer node 205b may overwrite data and thus invalidate it. The peer node 205b sends an instruction to node 205a to invalidate the data. The node 205a receives the instruction, invalidates the data D 1, and confirms to the peer node 205b that the data has been invalidated.

Figure 5:
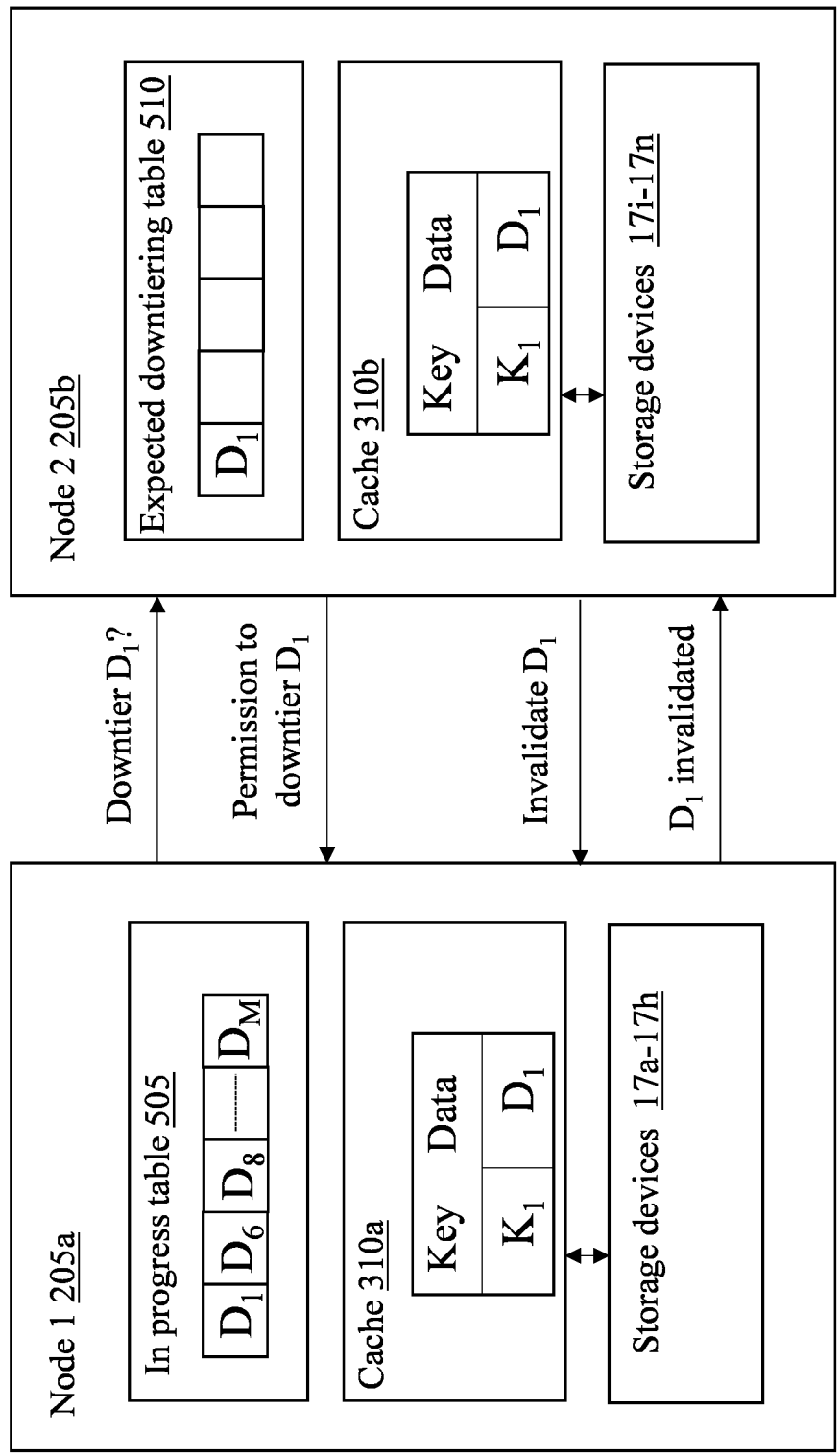
FIG. 5 is a schematic diagram depicting nodes in the computer system of FIGS. 1-2 with tables to managing overlapping communications regarding downtiering and invalidation of data.

As previously explained, network latencies may cause the communications on downtiering and invalidation to overlap, resulting in data corruption and/or wasted computing resources. Various embodiments of Applicants' solution use tables to track processes that are in progress, as shown in the exemplary computer systems 12 of FIG. 5. One such table is an in progress table 505.

When node 205a selects data to downtier from cache 310 to SSD 312, the node 205a adds the data to the in progress table 505. In some embodiments, the key (e.g., a logical address) corresponding to the data is added to the table 505. Then, the node 205a requests permission from node 205b to downtier the data, and waits for permission before migrating the data. Contemporaneously, node 205b may overwrite its circular buffer so as to invalidate the same data. The node 205b sends to node 205a an instruction to invalidate the data, and the node 205b may also respond to the node's 205a request and grant permission to downtier the data.

Either communication from node 205b may arrive at node 205a first. If the instruction to invalidate arrives first, the node 205a checks the in progress table 505 for the data. If the data is present, the node 205a recognizes that the node 205a previously sent a request for permission to downtier, and the permission is still outstanding. The node 205a invalidates the data stored in the cache 310a. The node 205a confirms to node 205b that the data has been invalidated, and because the node 205a found the data in the in progress table 505, the message includes a notice that a request for permission to downtier the data is outstanding.

Because the data is invalid, downtiering would migrate erroneous data to the SSD 312, thereby causing data corruption. The node 205a preempts this outcome by removing the data from the in progress table 505. As a result, when permission to downtier is received from node 205b, the node 205a checks the in progress table 505 for the data. Because the data will not be present, the node 205a can infer that the data has been invalidated and need not be downtiered. Consequently, the node 205a takes no further action with respect to the data, and thus refrains from expending unnecessary computing resources.

If permission to downtier the data arrives first, the node 205a checks the in progress table 505 for the data. Finding the data there, the node 205a removes the data from the table 505 and downtiers the data from cache 310a to SSD 312. When the subsequent instruction to invalidate arrives, the node 205a again checks the table 505; because the data has already been migrated, the data will not appear in the table 505. Because the SSD 312 serves as an extension to the cache 310, the node 205a invalidates the data in the SSD 312.

The node 205b must also guard against unwanted effects of the race between downtiering and invalidation. To this end, the node 205b includes a table of expected requests for permission to downtier data 510 ("expected downtiering table"). The node 205b uses this table 510 to identify situations in which data need not be downtiered because the data has or will be invalidated.

When the node 205b sends an instruction to invalidate data to a peer node 205a, the node 205b waits until the peer node 205a confirms its invalidation of the data before the node 205b invalidates the data in its own cache 310b. Contemporaneously, node 205a may decide to downtier the same data, and may request permission from node 205b before receiving the instruction to invalidate the data. As described above, in tandem with requesting permission to downtier, the node 205a adds the data to the in progress table 505. When responding to the instruction to invalidate the data, the node 205a checks the in progress table 505 to determine whether a request for permission to downtier the data is outstanding.

In such a situation, the node 205b will receive two communications from the node 205a: confirmation that the data has been invalidated and a request for permission to downtier the data. If the request for permission to downtier arrives first, the node 205b grants the permission, and migrates the data from cache 310b to SSD 312. When the node 205b receives the confirmation that the data has been invalidated, the node 205b searches the cache 310 and SSD 312 for the data, and invalidates it.

However, should confirmation that the data has been invalidated arrive first, the node 205b would normally invalidate the data in cache 310, and then migrate invalid data when the request for permission to downtier the data arrives. To prevent this situation, the node 205a includes in its confirmation of invalidation a notice to expect a request for permission to downtier the data. The node 205b adds the data to its expected downtiering table 510. Consequently, when the node 205b subsequently receives the request to downtier, the node 205b checks the expected downtiering table 510 for the data. If data is in the table 510, the node 205b can determine that the data should be invalidated. As a result, the node 205b takes no further action and does not migrate the data, thereby saving computing resources and preventing data corruption.

Figure 6:
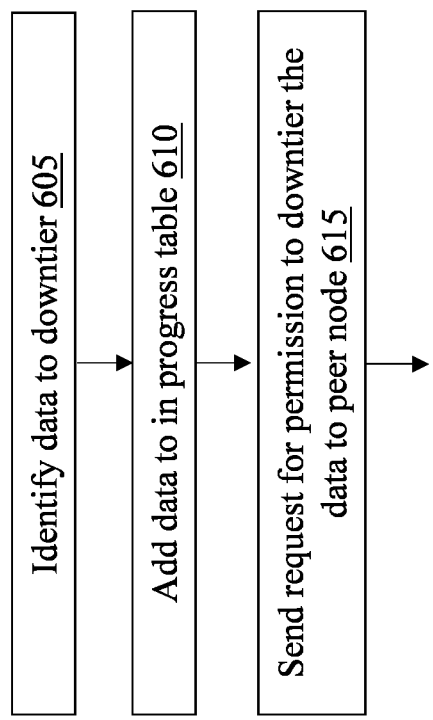
FIG. 6 is an exemplary flow diagram depicting how a node that downtiers data handles subsequent communications with a peer node regarding downtiering and invalidation of data.

FIGS. 6-8 are exemplary flow diagrams depicting how a node that downtiers data handles subsequent communications with a peer node regarding downtiering and invalidation of data. With respect to FIG. 6, a node 205a identifies data to downtier (step 605), and adds the data to an in progress table 505 (step 610). In some embodiments, the node adds a key, such as a logical address, associated with the data to the table 505. The node 205a sends a request for permission to downtier the data to a peer node 205b (step 615).

Figure 7A:
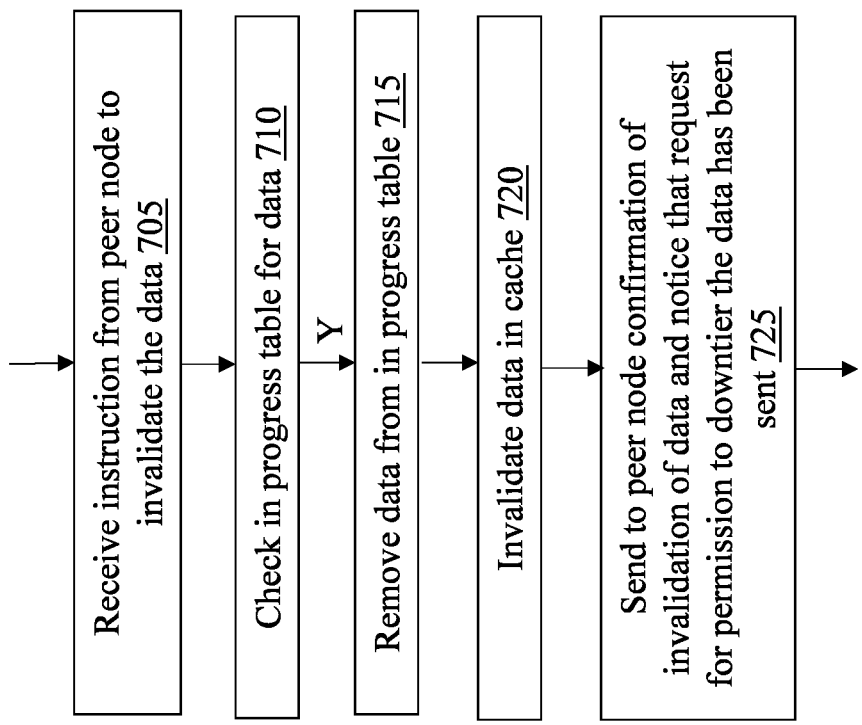
FIGS. 7A-7C are exemplary flow diagrams depicting how a node that downtiers data handles subsequent communications with a peer node regarding downtiering and invalidation of data.
Figure 7B:
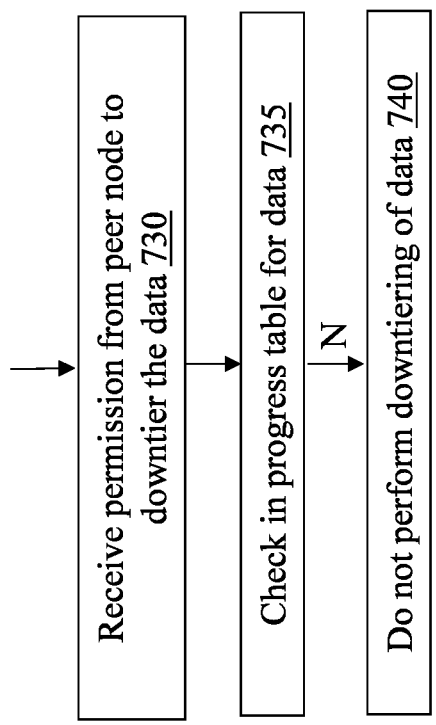

FIGS. 7A-7B are exemplary flow diagrams continuing from FIG. 6, in which the node 205a receives an instruction from the peer node 205b to invalidate the data before permission to downtier the data. The node 205a receives an instruction from the peer node 205b to invalidate the data (step 705). The node 205a checks the in progress table 505 for the data (step 710). Because the data has been entered in the table 505, the node 205a can determine that a request for permission to downtier the data is pending. Because the data is being invalidated, the node 205a prevents invalid data from being downtiered by removing the data from the in progress table 505 (step 715). The node 205a invalidates the data in the cache 310a (step 720). The node 205a sends to the peer node 205b confirmation of the invalidation of the data, and includes a notice that a request for permission to downtier the data has been previously sent (step 725).

Subsequently, the node 205a receives permission from the peer node 205b to downtier the data (step 730). The node 205a checks the in progress table 505 for the data (step 735). Because the node 205a previously received an instruction to invalidate the data, the data has been removed from the table 505. Thus, the node 205a can infer that, despite the granted permission to downtier the data, the data is invalid and need not be migrated. Thus, the node 205a does not perform downtiering of the data (step 740).

Figure 7C:
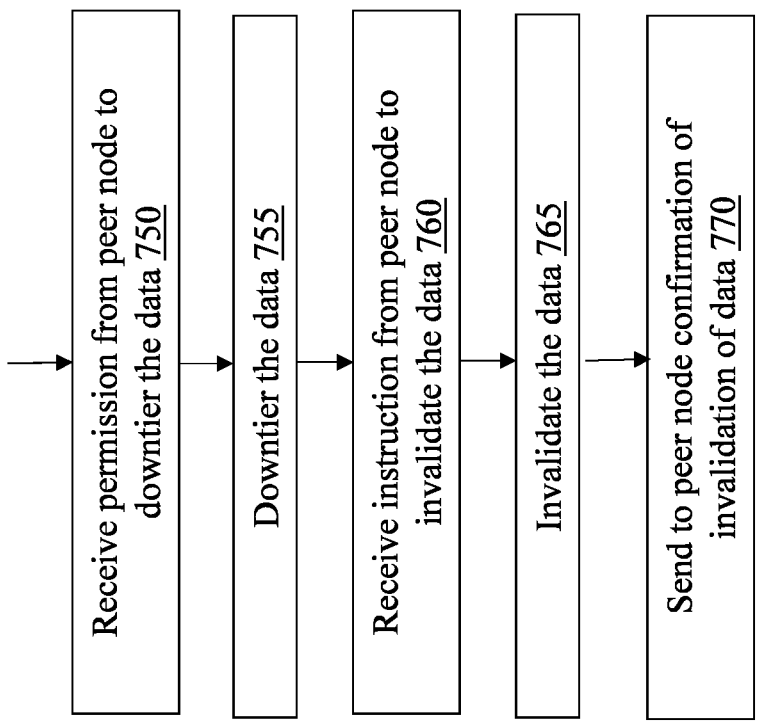

FIG. 7C is an exemplary flow diagram continuing from FIG. 6, in which the node 205a receives permission to downtier the data from the peer node 205b before an instruction to invalidate the data. The node 205a receives permission from the peer node 205b to downtier the data (step 750). The node 205a migrates the data from cache 310a to an SSD 312 (step 755). The node 205a receives instructions from the peer node 205b to invalidate the data (step 760). The node 205a checks its cache 310a and SSD 312 for the data, and invalidates the data when it is found (step 765). Then, the node 205a sends to the peer node 205b confirmation of the invalidation of the data (step 770).

Figure 8A:
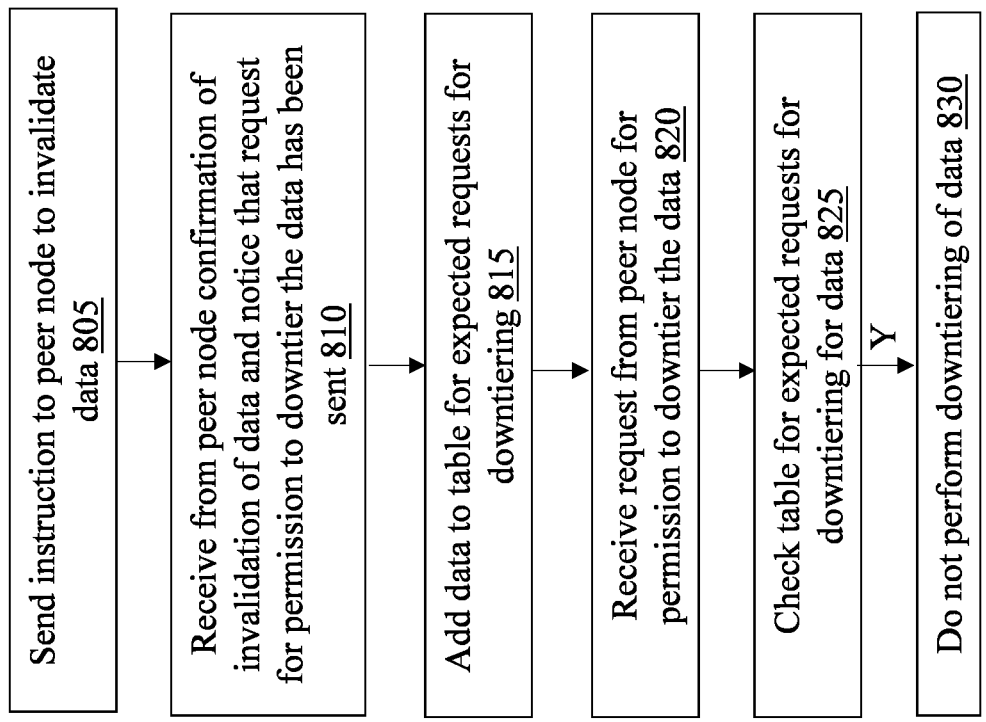
FIGS. 8A-8B are exemplary flow diagrams depicting how a node that invalidates data handles subsequent communications with a peer node regarding downtiering and invalidation of data.
Figure 8B:
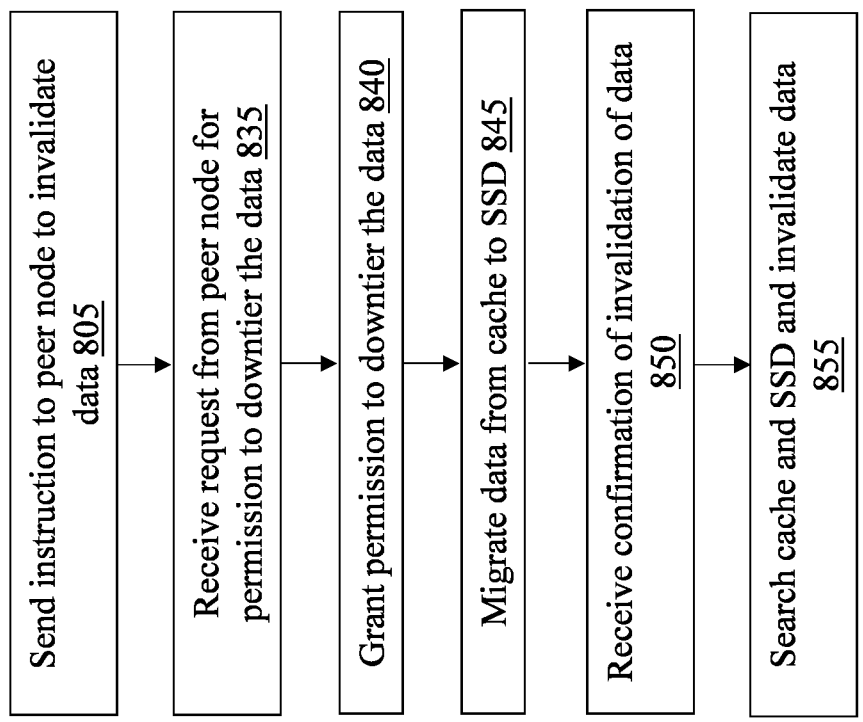

FIG. 8A-8B are exemplary flow diagrams depicting how a node 205b that invalidates data handles subsequent communications with a peer node regarding downtiering and invalidation of data. FIG. 8A depicts the flow when the node 205b receives confirmation that the data has been invalidated before request from node 205a for permission to downtier the data. The node 205b sends an instruction to the node 205a to invalidate the data (step 805). The node 205b receives from the node 205a confirmation of the invalidation of the data, and a notice that a request for permission to downtier the data has been sent (step 810). The node 205b adds the data to a table for expected requests for downtiering (step 815). The node 205b receives a request from the node 205a for permission to downtier the data (step 820). The node 205b checks the table for expected requests for downtiering, for the data (step 825). Because the table includes this data, the node 205b infers that the data has already been invalidated, and does not perform downtiering of the data (step 830).

FIG. 8B depicts the flow when the node 205b receives the request from node 205a for permission to downtier the data before the confirmation that the data has been invalidated. The node 205b sends an instruction to the node 205a to invalidate the data (step 805). The node 205b receives a request for permission to downtier the data from the node 205a (step 835), and grants permission (step 840). The node 205b migrates the data from cache to the SSD (step 845). Then, the node 205b receives confirmation from the node 205a that the data has been invalidated (step 850). The node 205b searches its cache and SSD for the data, and invalidates the data (step 855).

It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for managing overlapping communications regarding downtiering and invalidating cached data among nodes in a storage system, the method comprising:
   identifying, by a node, data to downtier;
   adding, by the node, the data to an in progress table;
   sending, by the node, a request for permission to downtier the data to a peer node;
   receiving, by the node, permission from the peer node to downtier the data;
   in response to the permission to downtier the data, checking, by the node, the in progress table for the data; and
   taking an action, by the node, based on a result of checking the in progress table.

2. The method of claim 1, further comprising:
   receiving, by the node, an instruction from the peer node to invalidate the data;
   checking, by the node, the in progress table for the data; and
   in response to finding the data in the in progress table, removing, by the node, the data from the in progress table.

3. The method of claim 2, further comprising:
   invalidating, by the node, the data in a cache.

4. The method of claim 2, further comprising:
   in response to finding the data in the in progress table, sending, by the node to the peer node, confirmation that the data has been invalidated and a message to expect the request for permission to downtier the data.

5. The method of claim 4, further comprising:
   receiving, by the peer node, the confirmation that the data has been invalidated and the message to expect the request for permission to downtier the data; and
   storing, by the peer node, the data in an expected downtiering requests table.

6. The method of claim 5, further comprising:
   invalidating, by the peer node, the data in a cache.

7. The method of claim 5, further comprising:
   receiving, by the peer node, the request for permission to downtier the data;
   in response to the request for permission to downtier the data, checking, by the peer node, the expected downtiering requests table for the data; and
   taking an action, by the peer node, based on a result of checking the expected downtiering requests table.

8. The method of claim 7, wherein taking the action based on the result of checking the expected downtiering requests table comprises:
   if the data has been found in the expected downtiering requests table, inferring, by the peer node, the data has been invalidated so as to leave the invalidated data in a cache; and
   if the data has not been found in the expected downtiering requests table, downtiering, by the peer node, the data from the cache to secondary storage.

9. The method of claim 1, wherein the taking of the action based on the result of checking the in progress table comprises:
   downtiering, by the node, the data from cache to secondary storage if the data has been found in the in progress table.

10. The method of claim 1, wherein the taking of the action based on the result of checking the in progress table comprises:
    if the data has not been found in the in progress table, inferring, by the node, the data has been invalidated so as to leave the invalidated data in a cache.

11. A storage system for managing overlapping communications regarding downtiering and invalidating cached data among nodes, the storage system including a processor configured to:
    identify, by a node, data to downtier;
    add, by the node, the data to an in progress table;
    send, by the node, a request for permission to downtier the data to a peer node;
    receive, by the node, permission from the peer node to downtier the data;
    in response to the permission to downtier the data, check, by the node, the in progress table for the data; and
    take an action, by the node, based on a result of checking the in progress table.

12. The storage system of claim 11, wherein the processor is further configured to:
    receive, by the node, an instruction from the peer node to invalidate the data;
    check, by the node, the in progress table for the data; and
    in response to finding the data in the in progress table, remove, by the node, the data from the in progress table.

13. The storage system of claim 12, wherein the processor is further configured to:
    invalidate, by the node, the data in a cache.

14. The storage system of claim 12, wherein the processor is further configured to:
    in response to finding the data in the in progress table, send, by the node to the peer node, confirmation that the data has been invalidated and a message to expect the request for permission to downtier the data.

15. The storage system of claim 14, wherein the processor is further configured to:
    receive, by the peer node, the confirmation that the data has been invalidated and the message to expect the request for permission to downtier the data; and
    store, by the peer node, the data in an expected downtiering requests table.

16. The storage system of claim 15, wherein the processor is further configured to:
    invalidate, by the peer node, the data in a cache.

17. The storage system of claim 15, wherein the processor is further configured to:
    receive, by the peer node, the request for permission to downtier the data;

in response to the request for permission to downtier the data, check, by the peer node, the expected downtiering requests table for the data; and take an action, by the peer node, based on a result of checking the expected downtiering requests table.

18. The storage system of claim 17, wherein the processor is further configured to:

if the data has been found in the expected downtiering requests table, infer, by the peer node, the data has been invalidated so as to leave the invalidated data in the cache; and if the data has not been found in the expected downtiering requests table, downtier, by the peer node, the data from the cache to secondary storage.

19. The storage system of claim 11, wherein the processor is further configured to:

downtier, by the node, the data from cache to secondary storage if the data has been found in the in progress table.

20. The storage system of claim 11, wherein the processor is further configured to:

if the data has not been found in the in progress table, infer, by the node, the data has been invalidated so as to leave the invalidated data in a cache.

* * * * *